Figure 8:
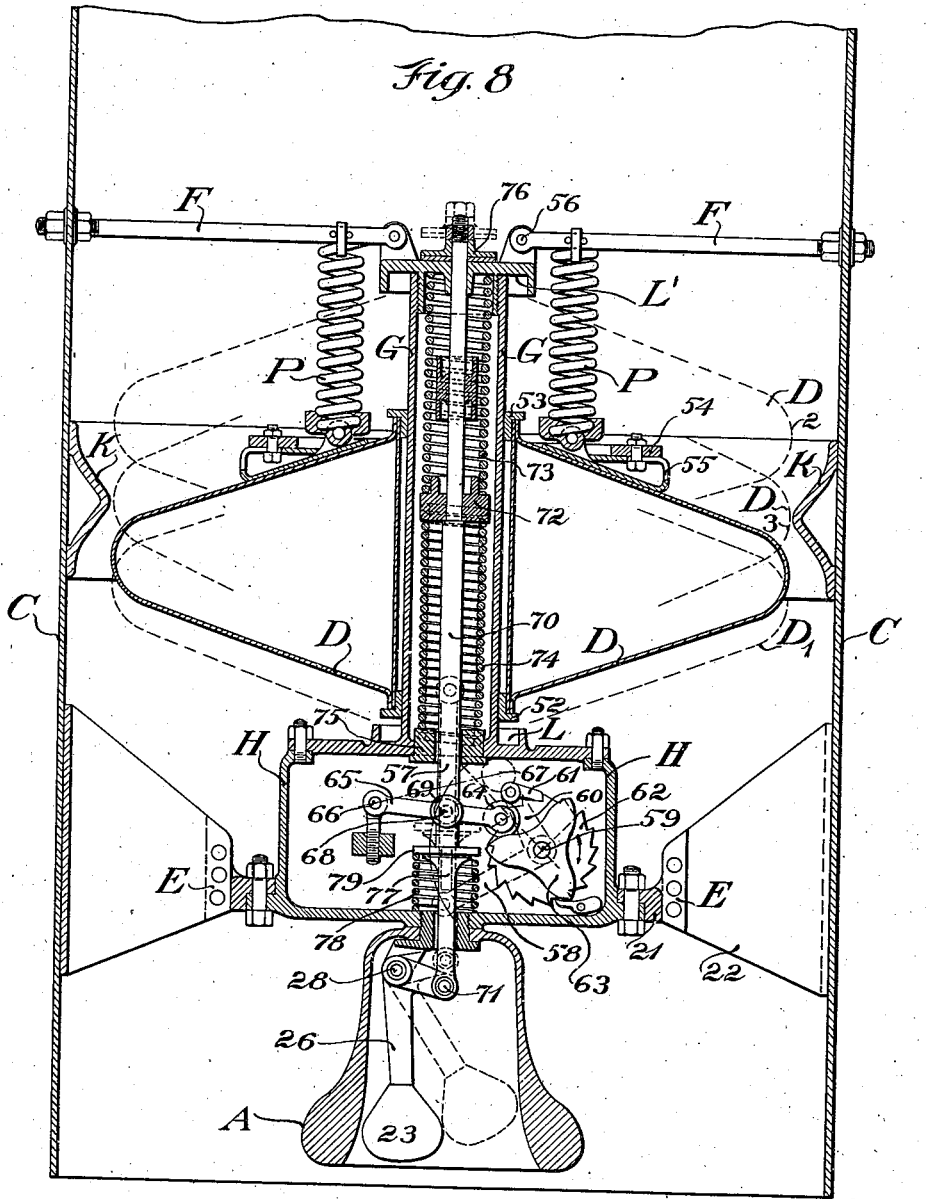

No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.
8 SHEETS-SHEET 1.
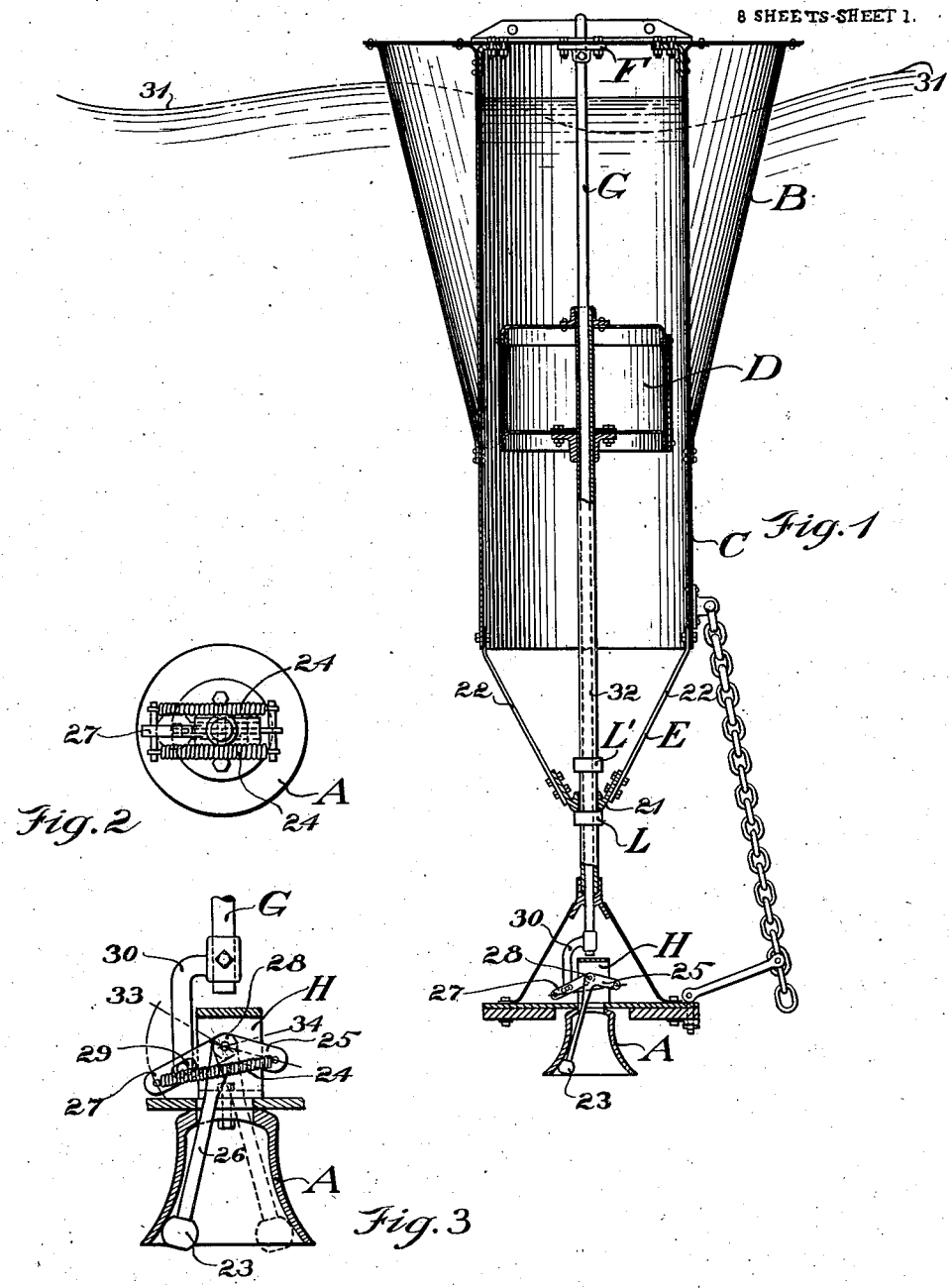
Witnesses
M. E. Flaherty
M. V. Foley
Inventors
Arthur J. Mundy
Horace B. Gale No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.
8 SHEETS—SHEET 2.
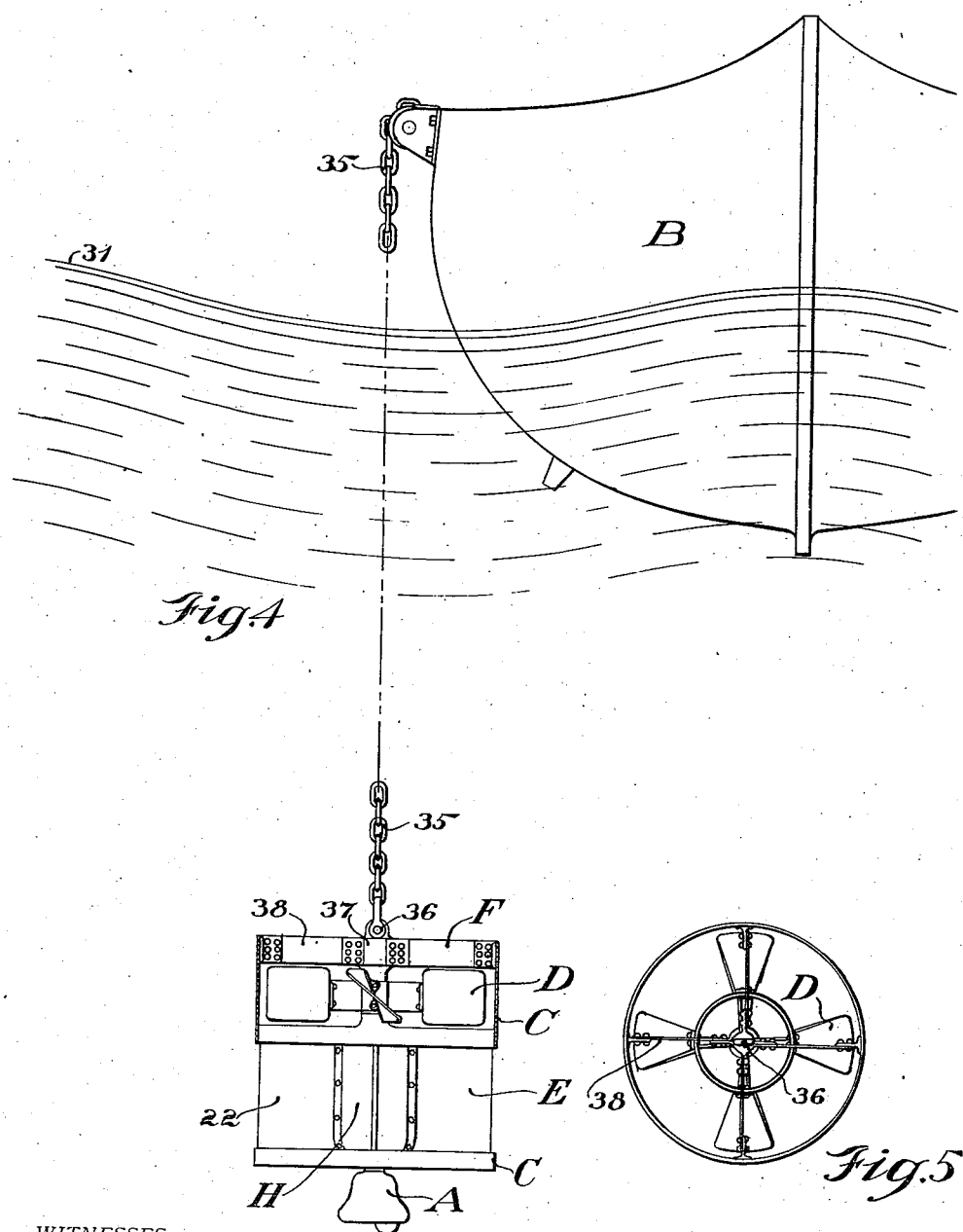
WITNESSES:
INVENTORS
BY
ATTORNEYS

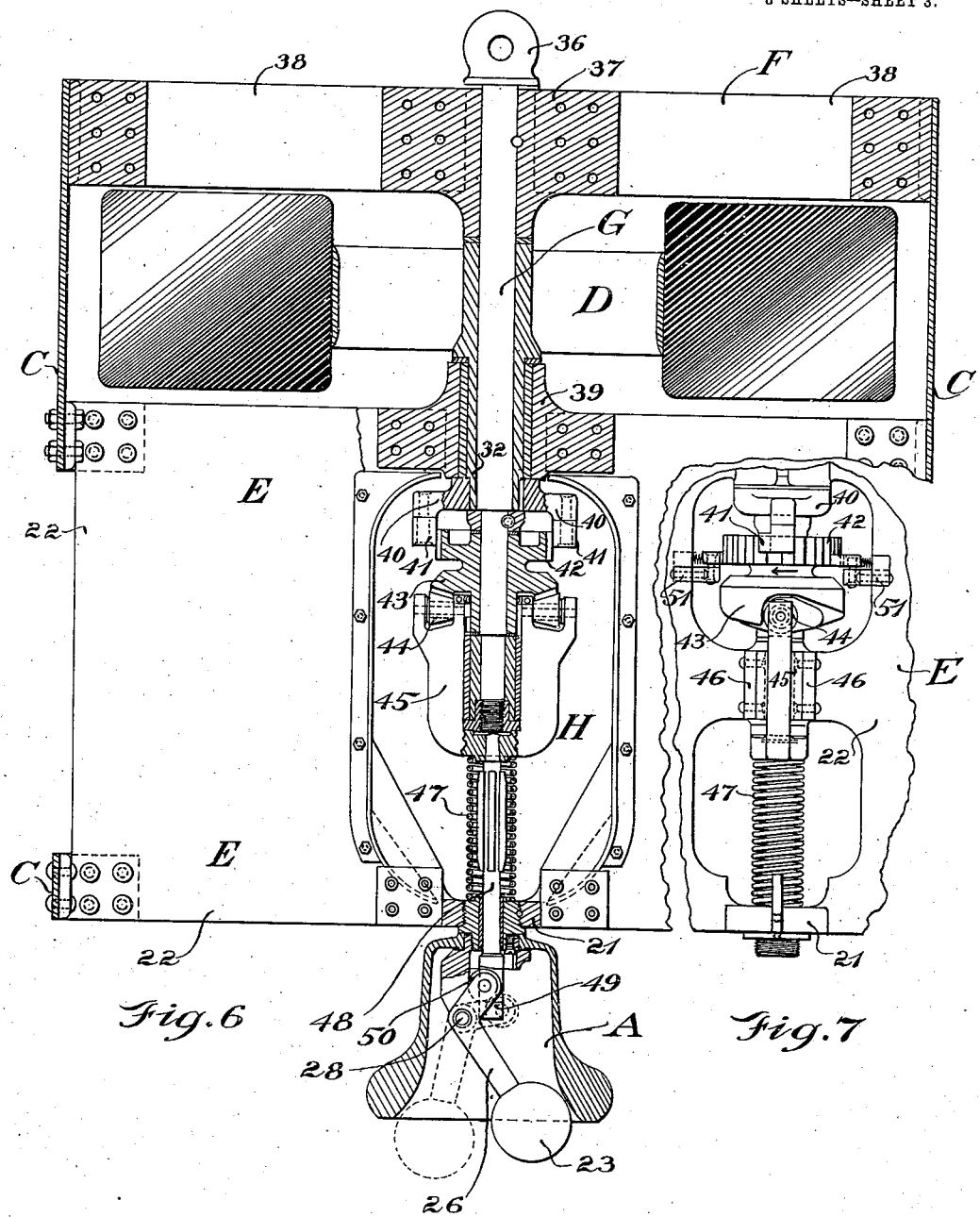

No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.

8 SHEETS—SHEET 4.

No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.

8 SHEETS—SHEET 5.

No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.

8 SHEETS—SHEET 6.

No. 842,327. PATENTED JAN. 29, 1907.
A. J. MUNDY & H. B. GALE.
APPARATUS FOR PRODUCING SUBMARINE SOUND SIGNALS.
APPLICATION FILED APR. 11, 1906.
8 SHEETS—SHEET 7.
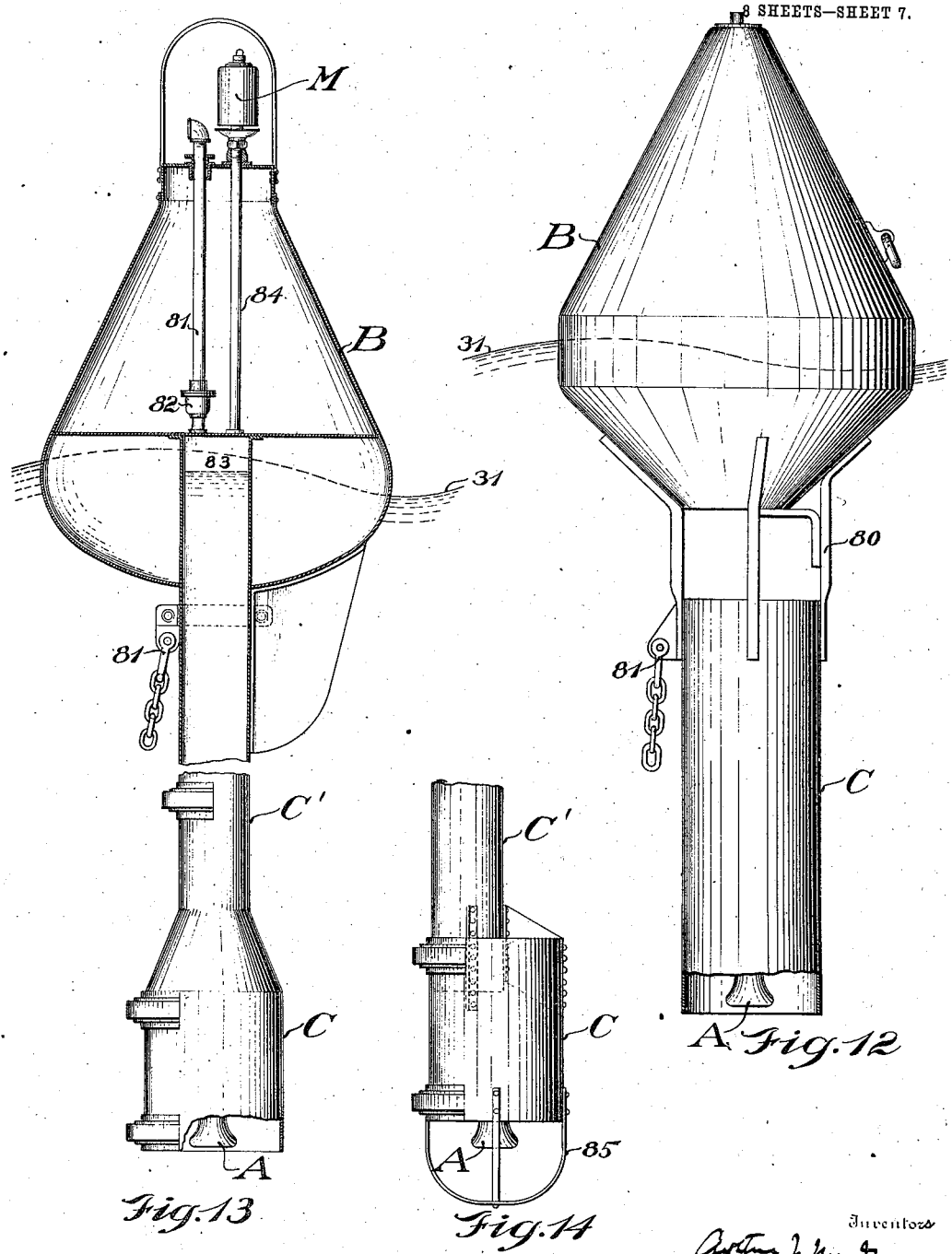

UNITED STATES PATENT OFFICE.

ARTHUR J. MUNDY, OF NEWTON, AND HORACE B. GALE, OF BOSTON, MASSACHUSETTS, ASSIGNORS TO SUBMARINE SIGNAL COMPANY, OF WATERVILLE, MAINE, A CORPORATION OF MAINE.

APPARATUS FOR PRODUCING SUBMARINE SOUND-SIGNALS.

No. 842,327.      Specification of Letters Patent.      Patented Jan. 29, 1907.

Application filed April 11, 1906. Serial No. 311,166.

*To all whom it may concern:*

Be it known that we, ARTHUR J. MUNDY, of Newton, in the county of Middlesex and State of Massachusetts, and HORACE B. GALE, of Boston, in the county of Suffolk, in said State, both citizens of the United States, have invented a new and useful Improvement in Apparatus for Producing Submarine Sound-Signals, of which the following is a full, clear, and exact description, reference being had to the accompanying drawings, forming a part of this specification, in explaining its nature.

Our experiments have shown that the most effective way to operate such apparatus by wave motion is to utilize the reaction between the vertical undulation of the surface water as applied to move a floating support and the inertia of a mass of comparatively still water at a considerable depth below the surface.

One object of our invention is to produce an efficient and durable device to operate upon this principle. To this end we employ, in combination with a supporting-body designed to float upon the surface of the water, such as a buoy or light-ship, a motor element immersed in a confined body of relatively still water below the supporting-body.

Another object of our invention is to produce a submarine signaling apparatus that is adapted to operate upon the same principle sound-signals in the air simultaneously with the submarine signal and without mutual interference between the two.

Other objects are to produce submarine signaling apparatus of extreme sensitiveness to small wave movements and at the same time having ample strength of construction and protection for the working parts to withstand the roughest kind of usage in storms at sea and in handling the apparatus on ships, &c.

Figure 9:
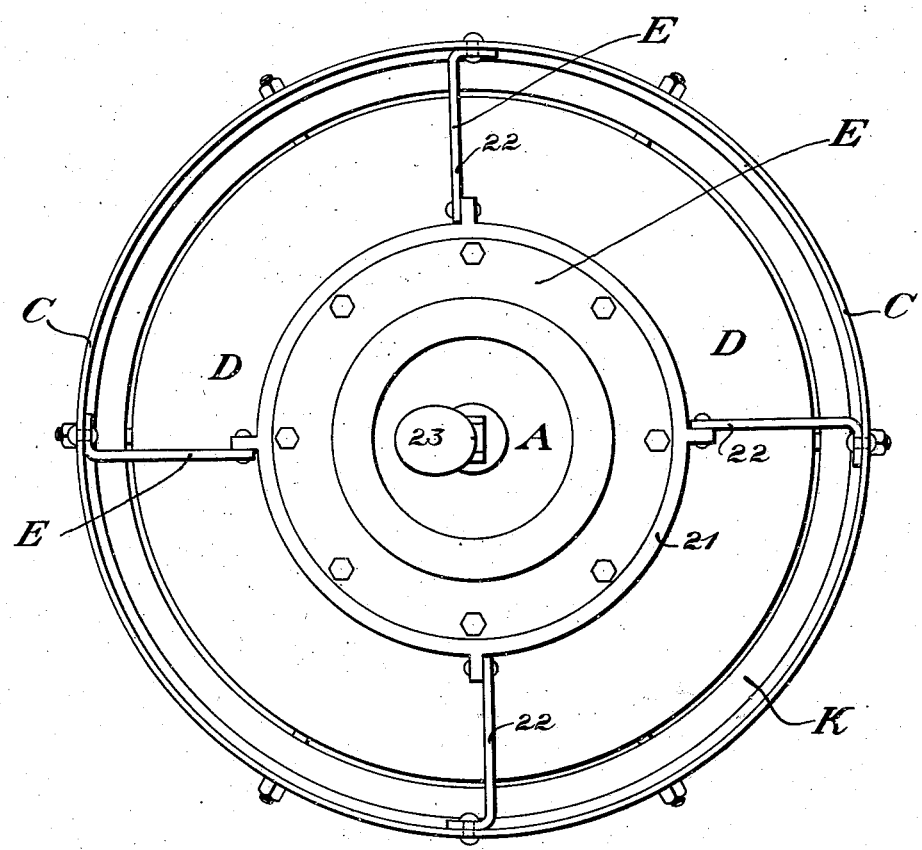
Figure 11:
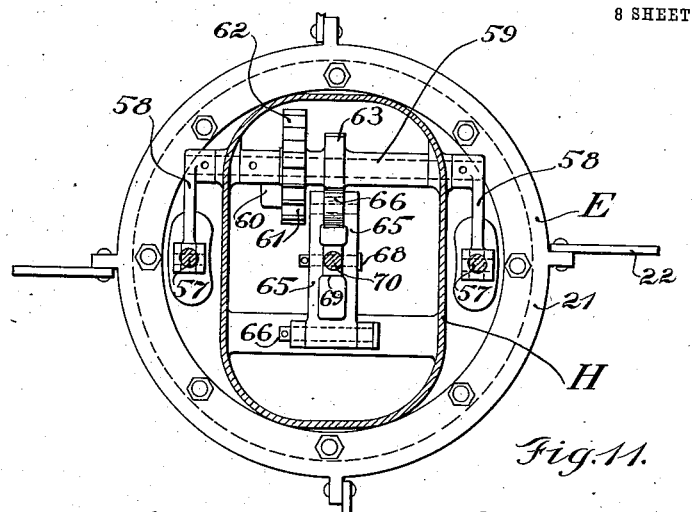
Figure 10:
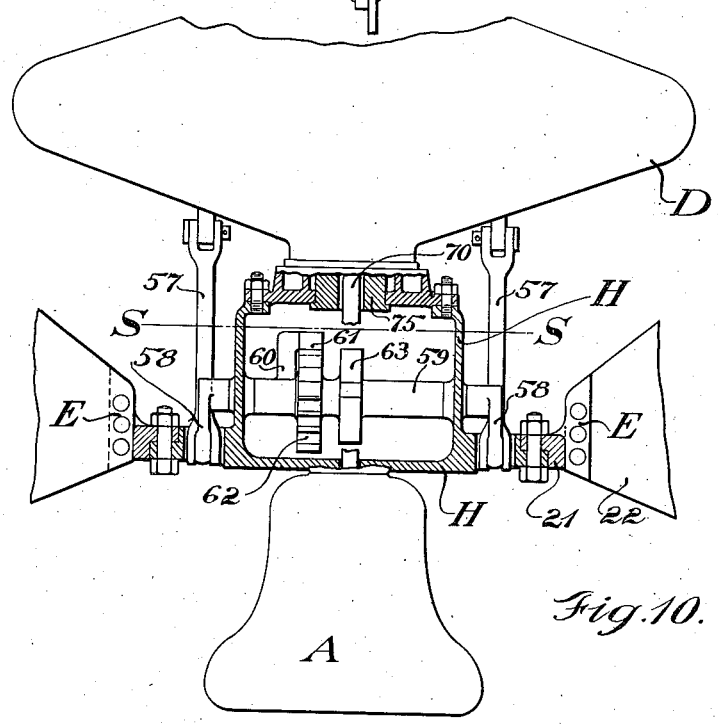
Figure 15:
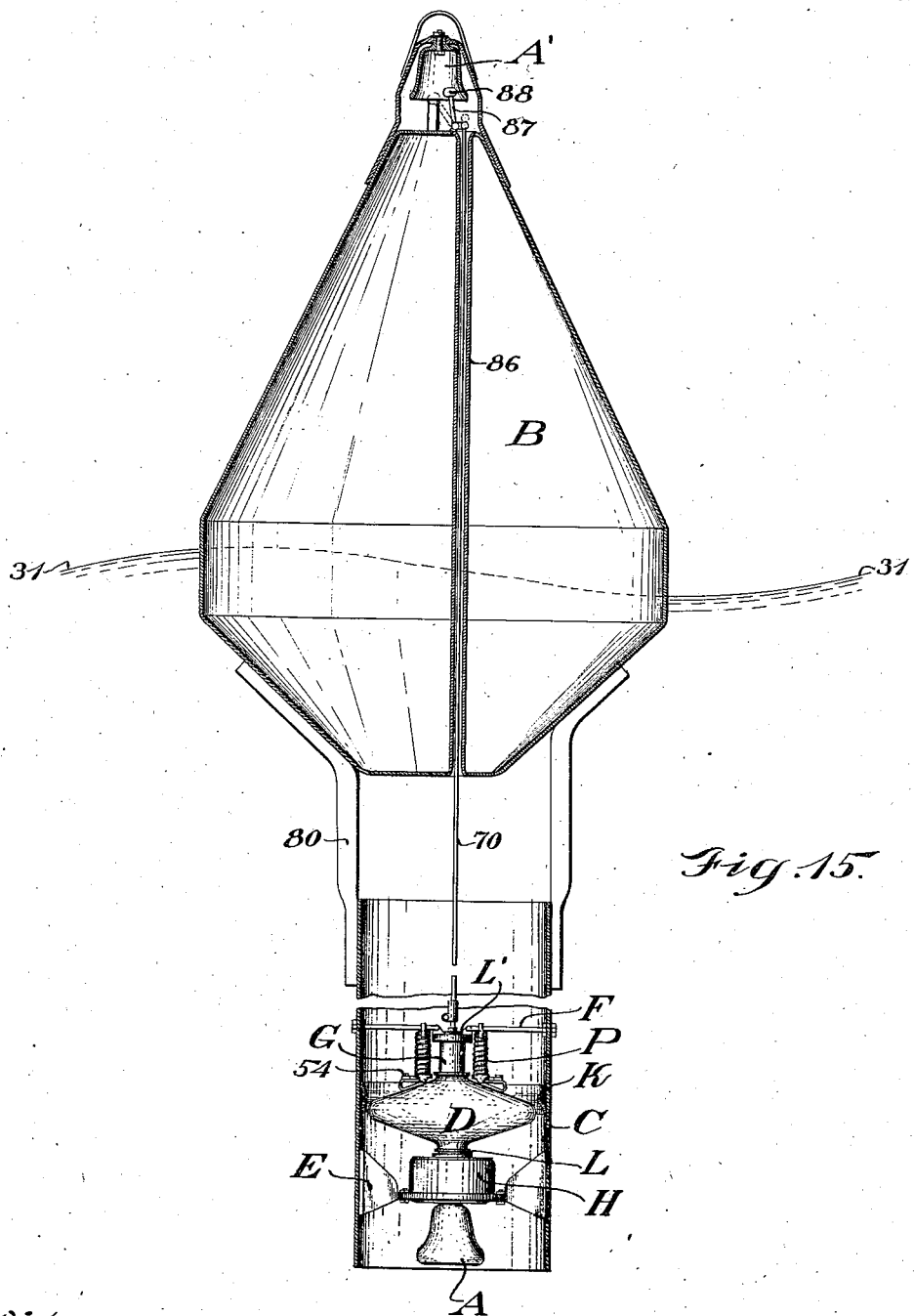

In the drawings, Figure 1 is a sectional elevation of one embodiment of our invention applied to a signal-buoy. Fig. 2 is a plan, and Fig. 3 an elevation, illustrating some details of the mechanism of Fig. 1. Fig. 4 is a diagram illustrating an application of our invention to the operation of a submarine signal on a light-ship. Fig. 5 is a plan view, and Figs. 6 and 7 are sectional elevations, on a larger scale, illustrating details of the device shown in Fig. 4. Fig. 8 is a sectional elevation illustrating the preferred form of the mechanism of our invention as adapted to be applied to the operation of either submarine signals or submarine and air signals simultaneously. Fig. 9 is an end view of the apparatus of Fig. 8, looking from the bottom upward. Fig. 10 is a vertical section through the case H, taken at right angles to the section shown in Fig. 8. Fig. 11 is a horizontal section on line S S of Fig. 10. Fig. 12 is an elevation of a plain submarine signal-buoy embodying the apparatus of Fig. 8. Figs. 13, 14, and 15 illustrate the application of the invention to the operation of both air and submarine signals.

Corresponding parts are similarly designated in the various views.

A indicates an underwater sound-producing device, which is represented as a submerged bell adapted to be struck by a clapper 23.

B indicates a buoyant body adapted to float upon the surface of the water and to support the submerged bell and other parts of the apparatus. In Figs. 1, 12, 13, and 15 the supporting-body is a buoy, and in Fig. 4 it is represented as a ship.

C indicates a tubular case attached to the buoyant support, and extending axially below it so as to inclose a mass of water in communication through the open lower end of the tube with the water at a considerable depth below the floating support. It will be apparent from the principle on which our invention depends that the mass of water inclosed in the tube C must be relatively still compared to the water which supports the buoyant body B. As the wave motion diminishes gradually downward from the surface it is therefore necessary for efficient operation of our invention that the open mouth of the tube C should be a considerable distance—several feet at least—below the under surface of the body B, whose vertical movement by the water operates the device. We prefer to make the tube C of cylindrical form; but it may be more or less conical and may have any shape of cross-section, provided only that it is adapted to fulfil the requirements above stated.

D indicates a motor element inclosed in the tube C. In Figs. 1, 8, 9, and 15 the motor element shown is a piston. In Figs. 4, 5, and 6 it is a screw-wheel. In either case it is immersed in the mass of comparatively still water in the tube C, which reacts upon the motor element by its inertia in the case of the piston to hold it back against the movement of the buoyant supporting-body by the waves and in the case of the screw-wheel to revolve it on its axis in one or the other direction, dependent upon the direction of movement of the body B and the attached parts. The motor element D is connected by suitable mechanism, to be hereinafter described, with the operating parts of the submerged sound-producing device A.

The word "piston" as used in this specification is not intended to convey the idea of a necessarily close-fitting device in the tube C, but means a body adapted to be immersed in the water of the tube so as to be acted on by its inertia and capable of a reciprocating motion within the tube and in the direction of its axis.

In order that the apparatus may be able to withstand without injury the buffeting of storms and the extremely rough usage to which buoys are liable in being handled on ships, it is necessary that the heavy submerged bell should be very strongly supported and held centrally, together with the piston or other motor element, in the axis of the tube. In devices previously constructed upon the principle of our invention—such, for example, as are described in United States Patent to A. J. Mundy, No. 725,755—the only means of supporting the submerged bell and its connected mechanism has been a long central rod or spindle depending from the buoy, which served also as a guide and support for the sea-anchor or motor element. This construction we have found not sufficiently stiff to meet the requirements of the service, and in order to provide a support of ample strength and rigidity we make use of the strength and stiffness of the tubular case C, inclosing the motor element. To avail ourselves of the rigid support of the tube C without impairing the sensitiveness of the apparatus by interfering with the freedom of the relative vertical movement of the inclosed water, we combine with the tubular case C an open frame or spider E, (see Figs. 8 and 9,) consisting of a central ring or hub 21 and radial pieces 22, attached to the tube near its lower end and so disposed as to support the bell and operating mechanism firmly at a point below the motor element D and between the latter and the bell. In our preferred form of construction represented in Figs. 8 and 9 the frame E supports the bell firmly at its neck and approximately in the center of gravity of the bell and operating mechanism. In this construction and also in that shown in Figs. 4, 6, and 7 the radial pieces 22 take the form of thin steel plates disposed vertically, so as to furnish a support of great strength and stiffness while offering the least possible resistance to relative up- and-down motions of the tube and the mass of water inclosed therein. On this frame or spider E we support also a central axial guide G for the motor element D. This guide consists, preferably, of a vertical cylindrical rod or tube on which, as shown in Figs. 1 and 8, the piston D can slide up and down between the limiting-stops L and L'. Figs. 6 and 7 show also the central axial guide G similarly supported; but in this case the motor element D instead of sliding vertically up and down has a rotary oscillating movement upon the guide G.

Interposed between the sound-producing device A and motor element D is a mechanism whereby the movement of the motor element is transformed and transmitted to operate the sound-producing device, and which, preferably, is adapted to store up the power transmitted to it by the motor element until a sufficient amount of energy has been accumulated, say, to strike a powerful blow upon the bell when the stored energy is suddenly released to actuate the bell-clapper 23 or other sound-producing means. This mechanism we have shown as inclosed in a case H. In the form of our invention illustrated in Figs. 1, 2, and 3 this mechanism comprises a pair of helical tension-springs 24, connected at one end to an arm 25, forming a part of the clapper-arm 26. At the other end the springs are attached to the end of the lever 27, which can turn on the same axis 28 as the clapper-arm and which has in it a slot 29, adapted to engage a pin carried by the rigid arm 30. This arm is rigidly attached to the rod G, which is fastened at its upper end to the frame F, carried on the upper end of the tube C, as shown in Fig. 1.

The operation of the device is as follows: The buoy B, which floats upon the surface of the water, (indicated by the line 31,) is moved up and down by the surface waves, and to it the tube C is rigidly attached. The water inclosed inside the tube C communicates through the open lower end of this tube with the water at a considerable depth below the surface, which is comparatively unaffected by the wave movement. This mass of water surrounds the motor element D, which, as shown in Fig. 1, is a hollow piston, and this surrounding mass of comparatively quiet water acts upon the piston D by its inertia to prevent it from following the movement of the buoy B. The piston D, in Fig. 1, has a tubular extension 32, which slides relatively to the guide-rod G when the latter is moved up and down with the buoy B. This sliding movement of the tube 32 is limited by the stops L and L', which in the form of the device shown in Fig. 1 come in contact with the hub 21 on the frame E. The relative movement of the rod G is transmitted by means of the rigid arm 30 to the lever 27, which is thus given an oscillatory movement on the pivot 28 from the lower position shown to the upper position indicated by the dotted line 33 in Fig. 3. When the buoy rises, the lever 27 is thus swung up to the position 33, which carries the line of tension of the springs 24 above the center 28. In this movement the springs 24 are extended, thus storing up a portion of the energy of the movement of the buoy. As soon as the lever reaches its extreme upper position 33 the contraction of the springs throws the arm 25 up into the position indicated by the dotted line 34, throwing the clapper 23 against the right-hand side of the bell, as shown by the dotted lines in Fig. 3, and delivering a sharp stroke upon the bell. When the buoy B drops into the hollow of a wave, the inertia of the water in the tube C reacts upward upon the piston D, allowing the central rod G to be carried down by the movement of the buoy through the tube 32, thus throwing the lever 27 back into its lower position, as shown in the full lines in Figs. 1 and 3. The springs 24 are thus carried below the pivot 28, and their contraction then draws the arm 25 down into its lower position, as shown, bringing the clapper 23 sharply in contact with the left-hand side of the bell.

In Figs. 4, 5, 6, and 7 we have shown a different type of motor element, which, however, operates upon the same principle as that already described. In Fig. 4 we have shown the tube C and the working parts of the device suspended by means of a chain 35 from the side of a ship, which forms in this case the floating support B, whose movement by the surface waves operates the device. The construction of the apparatus is shown more in detail in Figs. 6 and 7. The chain 35 is attached to the eye 36 at the upper end of the central guide-rod G, which is rigidly attached at its upper end to the hub 37 on the open frame F. This frame F comprises radial plates 38, which are attached at their outer ends to the tube C. The rod G is further supported near its lower end by the hub 39, carried by the radial plates 22. The bell A is rigidly supported at its upper end by the hub 21, also carried on the radial plates 22. These plates are attached at their outer ends to the tube C, and, together with the hubs 21 and 39, form the open frame E, which supports the bell and the mechanism-case H, while permitting a free flow of the water vertically between the radial plates 22 and through the tube C. The movement of the ship B by the surface waves is transmitted through the chain 35 to the tube C and the apparatus supported thereby, causing it to move up and down, carrying with it the motor element D, which in this form of the device is a screw-wheel. As this wheel is moved up and down through the mass of comparatively still water inclosed by the tube C the surrounding water acts by its inertia against the blades of the wheel D, giving the wheel a rotary motion in one direction when the tube C and the attached parts are moved upward and in the opposite direction when they are lowered. The screw-wheel D has a tubular extension 32, in Fig. 6, which carries on its lower end arms 40, on which are mounted a pair of pawls 41, which engage the teeth of a ratchet-wheel 42. Formed in one piece with the ratchet-wheel 42 is the spiral cam 43, whose under surface bears against the conical rollers 44. These rollers are mounted in a frame 45, which is free to slide vertically between the guides 46, which are supported by the radial plates 22 of the frame E. The frame 45 is pressed upward by the spring 47, so as to hold the conical rollers 44 in contact with the cam 43. The frame 45 carries a rod 48, which extends through an opening in the top of the bell A and has at its lower end a yoke 49, which bears upon the roller 50, carried by the upper end of the clapper-arm 26, which is pivoted at the point 28. The ratchet-wheel 42 is also engaged by the two pawls 51, mounted on one of the radial plates 22 of the frame E. The oscillating motion of the motor D, being imparted to the pawls 41, drives the ratchet-wheel 42 intermittently in the direction of the arrow in Fig. 7. The spiral face of the cam 43 is thus made to depress the rollers 44 and the frame 45, compressing the spring 47. This movement depresses also the rod 48 and the yoke 49, allowing the clapper 23 to fall back into the position shown in dotted lines in Fig. 6. The holding-pawls 51, mounted on the frame E, prevent the ratchet-wheel from swinging back when the movement of the motor D is reversed. When the cam 43 has been turned into the position shown in Fig. 7, the rollers 44 are suddenly thrown upward by the spring 47 and the clapper 23 is thrown sharply against the bell A, striking it in the position shown in full lines in Fig. 6. This operation will be, of course, repeated as long as the apparatus is moved up and down in the water, giving the screw-wheel D a reversing rotary motion. In Figs. 4 and 6 the tube C is shown in two sections, the upper and longer one inclosing the motor D and the shorter one connecting the bottom edges of the radial plates 22. It is obvious that the tube might be made continuous, if desired.

Figs. 8, 9, 10, and 11 illustrate the mechanism of our invention as we now prefer to construct it. The motor D, as here shown, consists of a hollow air-tight piston which is adapted to slide freely on the central guide-tube G between the stops L and L'. These stops are constructed in the form of annular dash-pots, into which the ends of the piston 52 and 53 fit loosely, so that when the piston D arrives at either end of its stroke its velocity is checked gradually in driving the water out of the dash-pots and the piston is brought to rest without shock. The piston is provided also with a pair of tension-springs P, attached to its upper side and supported at the top on the radial bars of the frame F, which hold the upper end of the guide-tube G centrally in the tube C. The piston D is also provided with a counterweight 54 in the form of an iron ring bolted to lugs 55 on the upper side of the piston. The counterweight and springs are so adjusted in relation to buoyancy of the piston D and the effort exerted by it upon the mechanism that the piston is balanced in the water at a position at or near the middle of its stroke, as indicated in the dotted lines $D^3$, Fig. 8. On the inside of the tube C is an inwardly-projecting circumferential ring K. The inner diameter of this ring is slightly larger than the outer diameter of the piston, so that the piston nearly fills the space inside the ring when it is at or near the middle of its stroke. Thus in this position the water in the tube can pass the piston only through the small clearance between it and the ring. Therefore the piston receives the full force of the inertia of the mass of water inclosed in the tube and is in this position extremely sensitive to small movements of the buoy. On the other hand, when the piston is at the lower end of its stroke, as shown in the dotted lines D', Fig. 8, or at the upper end, as shown in the dotted lines $D^2$, there is a considerable annular passage between the piston and the tube, allowing the water to flow past the piston with considerable freedom. It is obvious that if the piston filled the tube completely when its motion was stopped by coming in contact with the upper or lower stops L or L' the inertia of the entire mass of water in the tube C would have to be suddenly overcome, which would produce a sudden increase of pressure on the piston and would tend to increase the shock caused by stopping it at the end of its stroke. The area of the piston D and of the passage through the ring K being smaller than that of the body of the tube C, the movement of the piston D when near the middle of its stroke has a greater amplitude than the corresponding movement of the water in the tube C. Thus by means of the ring K the piston is made more sensitive to small movements when near the middle of its stroke than as if it filled the entire tube, while the shock of stopping it at the end is very greatly diminished. By the action of this ring combined with that of the balancing-springs P, which tend to keep the piston in the middle of its stroke or in its most sensitive position when the motion of the buoy is small, we are enabled to combine the advantages of an apparatus of great sensitiveness to small wave movements with the ability to withstand the violent action of a very rough sea without injury.

The construction of the open frame or spider E is shown in Figs. 8 and 9. The steel ring or hub 21 is supported on the four radial plates 22, which are fastened to the tube C making the whole structure similar to a wheel having great strength and stiffness to resist the strains that come upon it and yet permitting a free relative movement of the water between the thin plates 22. The mechanism-case H is bolted to the ring 21, so that the entire bell and mechanism may be readily slipped out of the tube C, if desired. In order to do this, the pins 56 are removed from the tie-rods F and the stop L' unscrewed from the top of the tube G, allowing the piston D to be slipped off the top of the tube.

The operation of the mechanism shown in Figs. 8, 10, and 11 may be described as follows: To the under side of the piston D are attached two links 57. (Shown in full lines in Fig. 10 and in dotted lines in Fig. 8.) Each of these links is connected at its lower end to the end of a lever 58. (Shown in dotted lines in Fig. 8 and in full lines in Fig. 11.) By means of these links the reciprocating vertical motion of the piston D is converted into an oscillation of the levers 58 about the axis of the shaft 59, which passes through the mechanism-case H and to which the levers 58 are attached. On this shaft 59 is fastened also a radial arm 60, on which is mounted a pawl 61. As the lever 60 is oscillated by the motion of the buoy the pawl 61 engages the teeth of the ratchet-wheel 62, so as to revolve the wheel intermittently in the direction of the arrow in Fig. 8. On the hub of this wheel is mounted a cam 63, which turns with the ratchet-wheel. A roller 64, carried by a forked lever 65, is engaged by the cam 63. The lever 65 is pivoted on the axis 66, and as the cam is revolved it lifts the roller 64, swinging the lever 65 from the position shown in full lines in Fig. 8 to a position indicated by the dotted line 67. The lever 65 is connected by the pin 68 with a hub 69, formed on the vertical rod 70. The lower end of this rod is connected by a pin-joint at the point 71 with the bell-crank lever 26, pivoted at the point 28 and carrying the bell-clapper 23. The rod 70 also passes up through the stop L' and carries a collar 72, to which are attached the springs 73 and 74. 73 is a compression-spring whose lower end rests on the collar 72, while its upper end bears against the stop L', so that the tendency of the spring is to force the collar 72 downward. 74 is a tension-spring whose ends are connected, respectively, to the collar 72 and to the collar 75, which bears against the top of the mechanism-case H, so that the tension of the spring 74 is also exerted downward upon the collar 72. This collar rests upon a shoulder upon the rod 70. At the upper end of the rod 70 is attached a disk 76, which rests against the stop L', preventing the springs from further depressing the rod 70. When the rod 70 is lifted by the action of the cam 63 and lever 65, the springs 73 and 74 are compressed and stretched, respectively, and the bell-clapper 23 is drawn back into the position shown in dotted lines in Fig. 8. When the point of the cam 63 passes under the roller 64, the latter is released to move downward freely, and the tension of the springs 73 and 74, exerted against the collar 72, drives the rod 70 quickly downward and throws the clapper 23 into the position shown in full lines in Fig. 8. The disk 76 coming in contact with the stop L' prevents the further motion of the rod 70; but near the lower end of this rod is a telescope joint 77, which permits the clapper 23 to move forward by its momentum and strike the bell A. The compression-spring 78, which bears against the collar 79 upon the lower sliding section of the rod 70, allows the clapper to move forward for this purpose and after it has struck the bell quickly draws it back to the position shown in full lines in the drawing. It is apparent from this description that very slight movements of the tube C will cause the ratchet-wheel 62 to be advanced gradually, carrying the cam 63, and that a blow will be struck upon the bell corresponding to the passage of each tooth of the cam under the roller 64. The force of this blow will depend entirely upon the weight of the parts and the strength of the springs 73 and 74 and not at all upon the rapidity or amount of the wave movement.

Fig. 12 shows our preferred method of constructing a buoy, especially for the purpose of operating a submarine signal of the character shown in Fig. 8. The figure illustrates the shape which we prefer to give the buoy and also the preferred method of attaching the tube C in order to get the maximum effect of the wave movement concentrated upon the motor D, which operates the submarine bell. The mechanism in the tube C in Fig. 12 is the same as has been shown in detail in Figs. 8, 9, 10, and 11. The tube C is attached to the buoy B by a strong framework of vertical steel bars 80. The attachment for the anchor-chain is shown at 81. The axis of the tube C is placed slightly to one side of the axis of the buoy in order that its weight may balance the weight of the anchor-chain, thus keeping the buoy in a vertical position. The portion of the buoy B below the water is made approximately conical, so that the sidewise movement of the surface water inward toward the buoy, which causes the latter to rise upon the wave, is deflected downward under the conical base and increases the pressure between it and the top of the tube C, thus tending to increase not only the lifting effort upon the buoy, but also the resistance of the water in the tube, acting to hold back the piston D. By means of the opening at the top of the tube in combination with this shape of the under body of the buoy the pressure of the wave at the surface which lifts the buoy is made to coöperate with the inertia of the water at the bottom of the tube C to hold back the piston D, and thus to actuate the submerged sound-producing device in the manner described.

The mechanism, as shown in Figs. 8, 9, 10, and 11, is adapted especially to the operation simultaneously of air-signals and submarine signals. Fig. 13 illustrates a combination whereby the same motion of the water in the tube C is enabled to operate simultaneously a whistle M, placed in the air at the top of the tube, and a submarine bell A, inclosed in the bottom of the tube. The tube C incloses the operating mechanism of the submarine bell, which has already been described, and is provided with a connecting-tube of smaller diameter C', which extends up into the interior of the buoy B, as shown. This section of the tube of smaller diameter is designed to promote the free access of the water to the under side of the buoy B, whereby the wave movement shall have a sufficient area to act upon and lift the buoy. If the large tube C inclosing the submarine bell and mechanism were carried up to the bottom of the buoy, it would materially reduce the area exposed to the pressure of the wave at the bottom of the buoy and diminish the power of the up-and-down movement. This cannot be compensated for by enlarging the diameter of the buoy, because if the diameter is greater than a half of the wave length the effect of the wave to lift the buoy is largely neutralized. The manner in which the whistle is operated by the water in combination with the bell A may be thus described: When the buoy B is lifted on the crest of a wave, the inertia of the water in the tubes C and C' holds back the piston D from following the motion of the buoy, forcing it down below its central position into a position such as shown in the full lines in Fig. 8. At the same time the water in the extension-tube C' falls through a greater height, owing to the smaller diameter of the tube C'. The lowering of the column of water in the tube C' draws in air through the pipe 81 and a check-valve 82 into the chamber 83 above the surface of the water in the tube C'. When the piston D comes in contact with the stop L, (see Fig. 8,) the relative motion of the water inclosed in the tubes C and C' would be suddenly stopped were it not for the annular passage which the motion of the piston past the ring K opens, allowing the water in the tube C to continue past the piston. This action combined with the smaller diameter of the tube C' causes the column of water in the tube C' to drop through a considerably greater distance than the water in the tube C, which itself moves a greater distance than the piston D. When the buoy B falls again into the hollow of the wave, the inertia of the water in the tube C acts in the opposite direction upward, and the action of the piston and the column of water in the tubes C and C' is reversed. The confined air in the chamber 83 is then driven out through the pipe 84 and through the whistle M, thus producing a blast of the whistle whose length is proportional to the movement of the buoy. By means of the combination of the two tubes of different diameter and the ring K in the larger tube the wave movement is enabled to operate the submarine bell A without interfering in any appreciable degree with the simultaneous operation of the whistle M.

Fig. 14 shows a modification of the relative positions of the tubes C' and C, in which the latter is set with its axis displaced to one side of the axis of the tube C' for the purpose of balancing the weight of the anchor-chain, (shown at 81, Fig. 13.) In Fig. 13 the submarine sound-producing device A is entirely inside the mouth of the tube C, whereas in Fig. 14 it is shown projecting below it and is protected from mechanical injury by means of the cage 85.

Fig. 15 illustrates the adaptability of the device shown in Fig. 8 to operate simultaneously the submarine bell A and an atmospheric bell A', mounted on the top of the buoy B. In this combination the tube C is constructed and attached to the buoy in the manner illustrated in Fig. 12, so as to get the maximum power applied to the piston D. This power is applied to strike the two bells simultaneously in the following manner: The rod 70, (shown in Fig. 8,) whose lower end is attached to the clapper 23 of the bell A, is extended upward through a tube 86, passing through the buoy B, and is attached at its upper end to the shorter arm of the bell-crank lever 87, so that the sudden downward movement of the rod 70 by means of the springs 73 and 74, Fig. 8, actuates simultaneously the clapper 23 of the bell A and the clapper 88 of the bell A', thus striking both bells simultaneously. This combination may be especially useful in determining the distance of the buoy from a vessel receiving the signals both through the water and through the air, as the difference in time between the stroke transmitted through the water and the stroke transmitted through the air enables the distance to be calculated by means of the difference in the velocity of sound in the two media.

It is apparent that the details of our invention may be considerably varied, while retaining the same essential elements, and we therefore do not restrict ourselves to the special forms shown and described; but

What we claim, and desire to secure by Letters Patent, is the following:

1. In an apparatus for producing sound-vibrations in water, by which they are transmitted, the combination of an under-water sound-producing devices a buoyant supporting-body adapted to float upon the surface of the water, an attached tube extending downward below the buoyant support and open at its lower end and a motor element adapted to be immersed in the water in the tube and to move responsively to relative axial movements of the water therein, said motor element being operatively connected to said under-water sound-producing device, substantially as set forth.

2. In a signal-buoy, the combination of an under-water sound-producing device, a motor element operatively connected thereto and adapted to have a reversing movement responsive to the up-and-down movement of the body of the buoy by the waves, and a tube, open at its lower end, extending downward below the buoy and inclosing the said motor element, substantially as set forth.

3. In an apparatus for producing sound-signals in water, by which they are transmitted, the combination of a buoyant support adapted to float upon the surface of the water and to be moved up and down by the waves, an attached tube, open at its lower end, extending downward from the buoyant support and adapted to inclose a mass of water practically unaffected by the wave movement, a motor element adapted to be immersed in the water in the tube and to be acted upon by the inertia of said mass of water, and an under-water sound-producing device operatively connected to said motor element, substantially as set forth.

4. In an apparatus for producing sound-signals in water, by which they are transmitted, the combination of a buoyant support adapted to float upon the surface of the water and to be moved up and down by the waves, an attached tube, open at its lower end, extending downward below the buoyant support so as to inclose a mass of water comparatively unaffected by the surface movement, a piston movably supported in the tube and adapted to be immersed in the said mass of water and acted upon by its inertia, and an under-water sound-producing device operatively connected to said piston, substantially as set forth.

5. In an apparatus for producing sound-signals in water, by which they are transmitted, the combination of a buoyant support adapted to float upon the surface of the water and to be moved up and down by the waves, an attached tube, open at its lower end, extending axially downward below the buoyant support so as to inclose a mass of water comparatively unaffected by the wave movement, a buoyant piston movably supported in the tube and adapted to be immersed in the said mass of water and acted upon by its inertia, and an under-water sound-producing device operatively connected to said piston, substantially as set forth.

6. In an apparatus for producing sound-vibrations in water, by which they are transmitted, the combination of an under-water sound-producing device, a buoyant body, a tube with its axis extending up and down supported thereby and open to the water at its lower end, means for supporting the said sound-producing device upon the tube, and a motor element adapted to be immersed in the water in said tube and to have a reversing movement responsive to the relative up-and-down movements of the water therein, operatively connected to said under-water sound-producing device.

7. In a signal-buoy, a floating support, a tube rigidly attached thereto with its axis extending up and down, said tube being open to the water at its lower end, an under-water sound-producing device, means for supporting the said sound-producing device under the buoy comprising an open frame attached to the tube and adapted to permit a relative up-and-down movement of the column of water therein, and a motor element adapted to have a reversing movement responsive to said up-and-down movement of the water in the tube and operatively connected to said under-water sound-producing device, substantially as set forth.

8. In a signal-buoy, an attached tube with its axis extending up and down, said tube being open to the water at its lower end, an under-water sound-producing device, means for supporting the said sound-producing device comprising an open frame, attached to the bottom of the tube and adapted to permit a relative up-and-down movement of the column of water therein, and a piston adapted to have a reversing movement responsive to said up-and-down movement of said column of water in which it is immersed, and operatively connected to said under-water sound-producing device, substantially as set forth.

9. In an apparatus for producing sound-signals in water, by which they are transmitted, the combination of a buoyant support adapted to float upon the surface of the water and to be moved up and down by the waves, a tube rigidly attached to said support, said tube being open at its lower end, and extending axially downward below the buoyant support, so as to inclose a mass of water comparatively unaffected by the wave movement, a motor element adapted to be acted upon by the inertia of said mass of water, an under-water sound-producing device operatively connected to said motor element, and a central axial guide for said motor element, substantially as set forth.

10. In an apparatus for producing sound-signals in water, by which they are transmitted, the combination of an under-water sound-producing device, a buoyant body, a tube attached thereto at or near its upper end and extending downward therefrom so as to reach comparatively still water, an open supporting-frame for the operating parts attached to the tube and adapted to permit a relative up-and-down motion of the water therein, an axial guide for the motor element supported by said frame, and a motor element operatively connected to said under-water sound-producing device, and adapted to have a reversing movement upon said axial guide responsive to said up-and-down motion of the water in the tube.

11. In an apparatus for producing sound-signals in water, by which they are transmitted, the combination of a buoyant body, a tube attached thereto extending downward under the water and open at its lower end, an under-water sound-producing device within or below said tube, a motor element in the tube operatively connected to said sound-producing device, and adapted to move responsively to relative axial movements of the water therein, and an open frame attached to the tube and adapted to support the sound-producing device at a point below the said motor element.

12. In an apparatus for producing sound-signals in water, by which they are transmitted, the combination of a buoyant body, a tube attached thereto extending downward under the water and open at its lower end, an under-water sound-producing device within or below said tube, a motor element in the tube operatively connected to said sound-producing device, and adapted to move responsively to relative axial movements of the water therein, an axial guide for the said motor element, and an open frame attached to the tube and supporting the said guide and sound-producing device at a point below the said motor element.

13. In an apparatus for producing sound-signals in water, by which they are transmitted, the combination of a buoyant supporting-body, a tube attached thereto extending downward below the same and open at its lower end, an under-water sound-producing device within or below said tube, a motor element operatively connected to said sound-producing device and adapted to move responsively to relative axial movements of the water in the tube, an axial guide for the said motor element, and an open frame attached to the tube and supporting the said guide and sound-producing device at a point between the latter and the said motor element.

14. In an apparatus for producing sound-signals in water, by which they are transmitted, the combination of a buoyant supporting-body, a tube attached thereto extending axially downward below the same and open at its lower end, an under-water sound-producing device within or below said tube, a piston operatively connected to said sound-producing device, and adapted to move responsively to relative axial movements of the water in the tube, an axial guide for the said piston, and an open frame attached to the tube and supporting the said guide and sound-producing device at a point between the latter and the said piston.

15. In an apparatus for producing sound-signals in water by which they are transmitted, the combination of a buoyant support adapted to float upon the surface of the water and to be moved up and down by the waves, an attached tube, open at its lower end, extending axially downward below the buoyant support and adapted to inclose a mass of water comparatively unaffected by the wave movement, a motor element adapted to be immersed in the water in the tube and to be acted upon by the inertia of said mass of water, an under-water sound-producing device and means, comprising a power-storing mechanism, operatively connecting the motor element with the said under-water sound-producing device.

16. In an apparatus for producing sound-signals in water, by which they are transmitted, the combination of a buoyant body, a tube attached thereto extending axially downward under the same and open at its lower end, an under-water sound-producing device within or below said tube, a piston in the tube, means, comprising a power-storing mechanism, operatively connecting the piston with the said under-water sound-producing device, and adapted to move responsively to relative axial movements of the water in the tube, an axial guide for the said piston, and an open frame, or spider, attached to the tube, supporting the said guide and sound-producing device at a point between the latter and the said piston.

17. In an apparatus for producing sound-signals in water, by which they are transmitted, the combination of a buoyant support adapted to float upon the surface of the water and to be moved up and down by the waves, an attached tube, open at its lower end, extending downward from the buoyant support and adapted to inclose a mass of water comparatively unaffected by the wave movement, a piston movably supported in the tube and adapted to be immersed in the said mass of water and acted upon by its inertia, an inwardly-projecting circumferential ring in the tube at or near the mid-stroke position of said piston and an under-water sound-producing device operatively connected to said piston, substantially as set forth.

18. In a signal-buoy, the combination of a buoyant support adapted to float upon the surface of the water and to be moved up and down by the waves, an attached tube open at its lower end extending axially downward from the said buoyant support so as to inclose a mass of water comparatively unaffected by the wave movement, an under-water sound-signaling device supported in or below said tube, an atmospheric sound-signaling device carried on the buoyant support and means adapted to be acted upon by the inertia of the water in said tube whereby both signaling devices are operated simultaneously, substantially as set forth.

19. In a signal-buoy, a whistle, a downward tubular extension of the buoy, an under-water sound-signaling device supported by said tubular extension, and means for operating said whistle and said under-water sound-signaling device simultaneously by the relative movements of the buoy and the mass of water inclosed in said tubular extension thereof.

20. In a signal-buoy, a buoyant support adapted to float upon the surface of the water, a tube open at its lower end extending downward therefrom, an open frame, or spider, attached to the said tube and adapted to permit relative axial movement of the column of water therein, an under-water sound-producing device supported by said open frame, an atmospheric sound-producing device mounted on said buoyant support, and means for operating both sound-producing devices simultaneously by the relative movement of the buoy and the mass of water inclosed in said tube, substantially as set forth.

21. In a signal-buoy, a buoyant support adapted to float upon the surface of the water, a tube open at its lower end extending downward therefrom, an open frame, or spider, attached to the said tube and adapted to permit relative axial movement of the column of water therein, an under-water sound-producing device supported by said open frame, an atmospheric sound-producing device mounted on said buoyant support, a piston movably supported in the tube, and an inwardly-projecting circumferential ring in the tube at or near the mid-stroke position of said piston, whereby both said sound-producing devices are operable simultaneously by the relative movement of the buoy and the mass of water inclosed in said tube, substantially as set forth.

22. In a signal-buoy, a buoyant support adapted to float upon the surface of the water, a tube open at its lower end extending downward therefrom, an open frame, or spider, attached to the said tube and adapted to permit relative axial movement of the column of water therein, an under-water sound-producing device supported by said open frame, an atmospheric sound-producing device, operable by compressed air, mounted on said buoyant support, a piston movably supported in the tube, and an inwardly-projecting circumferential ring in the tube at or near the mid-stroke position of said piston, whereby both said sound-producing devices are operable simultaneously by the relative movement of the buoy and the mass of water inclosed in said tube, substantially as set forth.

23. In a signal-buoy, a buoyant support adapted to float upon the surface of the water, a tube open at its lower end extending downward therefrom, an enlarged section at the lower end of said tube, an open frame, or spider, attached thereto and adapted to permit relative axial movement of the column of water in the tube, an under-water sound-producing device supported by said open frame, an atmospheric sound-producing device, operable by compressed air, mounted on said buoyant support, and means for operating both sound-producing devices simultaneously by the relative movement of the buoy and the mass of water inclosed in said tube, substantially as set forth.

24. In a signal-buoy, a buoyant support adapted to float upon the surface of the water, a tube open at its lower end extending downward therefrom, an under-water sound-producing device supported on said tube, an atmospheric sound-producing device, operable by compressed air, mounted on said buoyant support, a piston movably supported in the tube, and an inwardly-projecting circumferential ring in the tube at or near the mid-stroke position of said piston, whereby both said sound-producing devices are operable simultaneously by the relative movement of the buoy and the mass of water inclosed in said tube, substantially as set forth.

25. In a signal-buoy, the combination of an under-water sound-signaling device, a motor element operatively connected thereto and adapted to have a reversing movement responsive to the up-and-down movement of the buoy by the waves, a tube below the buoy open at its lower end inclosing the said motor element, and an extension of said tube of smaller diameter connecting the same with the body of the buoy, substantially as set forth.

26. In a signal-buoy, the combination of a buoyant support adapted to be moved up and down by the waves, an atmospheric sound-signaling device operable by compressed air mounted on said buoyant support, a tube extending downward therefrom inclosing a mass of water comparatively unaffected by the wave movement, a compressed-air chamber above the water at the top of said tube variable by the relative movement of the buoy and the column of water inclosed in the tube and connected with said atmospheric sound-signaling device, the lower section of said tube being of larger diameter, a motor element inclosed in said enlarged section and an under-water sound-signaling device supported at the bottom of said enlarged section and operatively connected to said motor element.

27. In a signal-buoy, the combination of a buoyant support adapted to be moved up and down by the waves, an atmospheric sound-signaling device operable by compressed air mounted on said buoyant support, a tube extending downward therefrom adapted to inclose a mass of water comparatively unaffected by the wave movement, a compressed-air chamber above the water at the top of said tube variable by the relative movement of the buoy and the column of water inclosed in the tube and connected with said atmospheric sound-signaling device, the lower section of said tube being of larger diameter, a motor element inclosed in said enlarged section, an axial guide for the said motor element, and an under-water sound-signaling device supported at the bottom of said enlarged section and operatively connected to said motor element.

28. In a signal-buoy, the combination of a buoyant support adapted to be moved up and down by the waves, an atmospheric sound-signaling device operable by compressed air mounted on said buoyant support, a tube extending downward therefrom inclosing a mass of water comparatively unaffected by the wave movement, a compressed-air chamber above the water at the top of said tube variable by the relative movement of the buoy and the column of water inclosed in the tube and connected with said atmospheric sound-signaling device, the lower section of said tube being of larger diameter, a motor element inclosed in said enlarged section, an axial guide for the said motor element, a frame, or spider, attached to said enlarged section adapted to permit axial movement of the water in the tube, and an under-water sound-producing device supported by said frame, and operatively connected to said motor element.

29. In a signal-buoy, the combination of a buoyant support adapted to be moved up and down by the waves, an atmospheric sound-signaling device operable by compressed air mounted on said buoyant support, a tube extending downward therefrom adapted to inclose a mass of water comparatively unaffected by the wave movement, a compressed-air chamber above the water at the top of said tube variable by the relative movement of the buoy and the column of water inclosed in the tube and connected with said atmospheric sound-signaling device, the lower section of said tube being of larger diameter than the upper, a piston movably supported therein, an inwardly-projecting circumferential ring on said enlarged section of tube through which the said piston travels in the operation of the device and an underwater sound-producing device operatively connected to said piston.

30. In a signal-buoy the combination of a buoyant support adapted to be moved up and down by the waves, an atmospheric sound-signaling device operable by compressed air mounted on said buoyant support, a tube extending downward therefrom inclosing a mass of water comparatively unaffected by wave movement, a compressed-air chamber above the water at the top of said tube variable by the relative movement of the buoy and the column of water inclosed in the tube and connected with said atmospheric sound-signaling device, the lower section of said tube being of larger diameter than the upper, a piston movably supported therein, an axial guide for the said piston, an inwardly-projecting circumferential ring on said enlarged section of tube through which the said piston travels in the operation of the device and an under-water sound-producing device operatively connected to said piston.

31. In a signal-buoy, the combination of a buoyant support adapted to be moved up and down by the waves, an atmospheric sound-signaling device operable by compressed air mounted on said buoyant support, a tube extending downward therefrom adapted to inclose a mass of water comparatively unaffected by the wave movement, a compressed-air chamber above the water at the top of said tube variable by the relative movement of the buoy and the column of water inclosed in the tube and connected with said atmospheric sound-signaling device, the lower section of said tube being of larger diameter than the upper, a piston movably supported therein, an axial guide for the said piston, an inwardly-projecting circumferential ring on said enlarged section of tube through which the said piston travels in the operation of the device, a frame, or spider, attached to the tube and adapted to permit relative axial movement of the water therein, and an underwater sound-producing device supported by said frame and operatively connected to said piston, substantially as and for the purposes set forth.

32. In a signal-buoy, the combination of a buoyant support adapted to be moved up and down by the waves, an atmospheric sound-signaling device operable by compressed air mounted on said buoyant support, a tube extending downward therefrom and adapted to inclose a mass of water comparatively unaffected by the wave movement, a compressed-air chamber above the water at the top of said tube variable by the relative movement of the buoy and the column of water inclosed in the tube and connected with said atmospheric sound-signaling device, an open frame, or spider, attached to the said tube and adapted to permit relative axial movement of the column of water therein, an underwater sound-producing device supported by said frame, and means for operating both said sound-producing devices simultaneously by the relative movement of the buoy and the column of water inclosed in said tube, substantially as set forth.

33. In an apparatus for producing sound-signals in water, by which they are transmitted, the combination of a buoyant support adapted to float upon the surface of the water and to be moved up and down by the waves, an attached tube, open at its lower end, extending downward from the buoyant support and adapted to inclose a mass of water comparatively unaffected by the wave movement, a piston movably supported in the tube and adapted to be immersed in the said mass of water and acted upon by its inertia, stops for the piston, an inwardly-projecting circumferential ring in the tube at or near the mid-stroke position of said piston and an under-water sound-producing device operatively connected to said piston, substantially as set forth.

34. In a signal-buoy, the combination of a buoyant support, a tube open at its lower end extending downward therefrom, a motor element operable by the relative movement of the water in said tube, an under-water sound-producing device, a frame attached to said tube adapted to support said sound-producing device and to permit axial movement of the water in the tube, and means, comprising a power-storing mechanism, operatively connecting the said motor element with the said under-water sound-producing device, substantially as set forth.

35. In a signal-buoy, the combination with the supporting-body of an attached tube below the same, a piston movably supported in the tube, a contracted ring inside the tube through which the piston travels, and an under-water sound-producing device operatively connected to the piston.

36. In a signal-buoy, the combination with the supporting-body of an attached tube below the same, a piston movably supported in the tube and operatively connected with the signaling device, stops for the piston and means adapted to return the piston to an intermediate position between said stops, substantially as set forth.

37. In a signal-buoy, the combination of a tube with its axis extending up and down below the buoy open to the water at its lower end, a piston inclosed in said tube and movable by the relative motion of the water therein, and an under-water sound-producing device actuated by such movement of the piston, substantially as set forth.

38. In a signal-buoy, the combination of a tube below the body thereof open to the water at its lower end, a movable piston inclosed in said tube, a central axial guide for said piston, an open frame connecting said guide and the sides of the tube and adapted to permit a free vertical movement of the water therein, and an under-water sound-producing device operatively connected with the piston, substantially as set forth.

39. In a signal-buoy, the combination with the supporting-body of a tube extending axially downward therefrom and open to the water at its lower end, a whistle operable by the relative movement of the water in said tube, a piston in the tube movable by the relative motion of the water therein, an under-water sound-signaling device operatively connected with the piston, stops limiting the stroke of the piston and an enlarged passage for the water past the piston at each end of the stroke, whereby the whistle and under-water sound-signal are operable conjointly by the relative movement of the water in the tube, without mutual interference, substantially as set forth.

40. In a signal-buoy, the combination with the supporting-body of a tube extending below the same, a piston movably supported in the tube, a bell in or below the tube operatively connected with the piston, and an open frame adapted to support the bell on the tube and to permit axial movement of the water therein, substantially as set forth.

41. In a signal-buoy, the combination with the supporting-body of a tube extending below the same, a piston movably supported in the tube, an axial guide for the piston, a bell in or below the tube, operatively connected with the piston, and an open frame adapted to support the bell on the tube and to permit axial movement of the water therein, substantially as set forth.

42. In a signal-buoy, the combination with the supporting-body of a tube extending below the same, a piston movably supported in the tube, an axial guide for the piston, a bell in or below the tube, operatively connected with the piston, an open frame adapted to support the bell on the tube and to permit axial movement of the water therein, a closed air-chamber above the water at the upper end of the tube, and a whistle operatively connected thereto, substantially as set forth.

43. In a signal-buoy, the combination with the supporting-body of an attached tube below the same, a piston movably supported in the tube and operatively connected with the signaling device, dash-pots to check the motion of the piston at the ends of the stroke, and means adapted to return the piston to a position intermediate the ends of the stroke, substantially as set forth.

44. In a signaling apparatus, a buoy, a tube extending downwardly therefrom open at its lower end, a motor located within said tube and adapted to have a motion with relation thereto, and a sounder having a movable element, and connections between said motor and the movable element of said sounder, as described.

45. In a signaling apparatus, a buoy, a tube extending downwardly therefrom, said tube being open at both ends to the water, a sounder connected with said tube, and a motor located within said tube, and connections between said motor and said sounder whereby said sounder will be operated by the relative movement between it and said motor.

46. In a signaling apparatus, a buoy, a tube extending downwardly therefrom and open at both ends to the water, a sounder connected to said tube, and a motor located within said tube and adapted to operate said sounder, the walls of said buoy approaching each other below the normal water-line, whereby the waves engaging the under surface of the buoy in approaching and receding from it, will be effective to magnify the relative movement of the buoy and motor, as described.

47. In a signaling apparatus, a buoy, a tube extending downwardly therefrom and adapted to be entirely submerged in water and open at both ends, a sounder connected to said tube, and a motor located within said tube, and means whereby the movement of the motor within said tube causes the operation of said sounder, as described.

ARTHUR J. MUNDY.
HORACE B. GALE.

In presence of—
  FULTON BLAKE,
  JOHN E. R. HAYES.